United States Patent [19]

Whitmer

[11] Patent Number: 5,396,746
[45] Date of Patent: Mar. 14, 1995

[54] MOLDING CONSTRUCTION

[76] Inventor: Bruce F. Whitmer, 7133 Dark Lake Dr., Clarkston, Mich. 48346

[21] Appl. No.: 257,476

[22] Filed: Jun. 9, 1994

Related U.S. Application Data

[63] Continuation of Ser. No. 1,746, Jan. 7, 1994, abandoned.

[51] Int. Cl.6 .............................................. E06B 3/00
[52] U.S. Cl. ................................. 52/208; 52/204.597; 296/93; 296/201
[58] Field of Search ................ 52/208, 400; 49/489.1; 296/93, 201

[56] References Cited

U.S. PATENT DOCUMENTS

| | | |
|---|---|---|
| 3,378,457 | 4/1968 | Frehse ........................ 49/489.1 X |
| 4,135,277 | 1/1979 | Taniai et al. . |
| 4,165,119 | 8/1979 | Hedeen et al. . |
| 4,532,741 | 8/1985 | Knidel . |
| 4,617,759 | 10/1986 | Pasqualini et al. ........... 49/489.1 X |
| 4,621,469 | 11/1986 | Kruschwitz .................... 52/208 |
| 4,648,222 | 3/1987 | Miyata et al. . |
| 4,683,694 | 8/1987 | Ziegler . |
| 4,712,826 | 12/1987 | Omori . |
| 4,765,673 | 8/1988 | Frabotta et al. . |
| 4,805,363 | 2/1989 | Gold . |
| 4,813,733 | 3/1989 | Gustafson et al. . |
| 4,833,847 | 5/1989 | Inayama et al. .................... 52/208 |
| 4,905,432 | 3/1990 | Romie . |
| 4,950,019 | 8/1990 | Gross . |
| 4,986,594 | 1/1991 | Gold et al. . |
| 4,989,912 | 2/1991 | Furman . |
| 5,009,462 | 4/1991 | Katcherian . |
| 5,032,444 | 7/1991 | Desir, Sr. . |
| 5,088,787 | 2/1992 | Gross . |
| 5,094,498 | 3/1992 | Yada . |
| 5,114,206 | 5/1992 | Yada ............................... 52/208 X |
| 5,139,302 | 8/1992 | Kanke . |
| 5,154,471 | 10/1992 | Mimura et al. . |
| 5,171,051 | 12/1992 | Yada . |
| 5,174,623 | 12/1992 | Yada et al. . |
| 5,174,624 | 12/1992 | Yada et al. . |
| 5,176,420 | 1/1993 | Kato . |
| 5,193,876 | 3/1993 | Yada et al. . |
| 5,228,738 | 7/1993 | Kato . |
| 5,257,450 | 11/1993 | Tamura . |
| 5,273,338 | 12/1993 | Gooding et al. . |
| 5,310,236 | 5/1994 | Tamura et al. . |

FOREIGN PATENT DOCUMENTS

| | | |
|---|---|---|
| 0249560 | 2/1987 | France . |
| 3245928 | 6/1984 | Germany . |
| 3-88817 | 9/1991 | Japan . |
| 2142685 | 1/1985 | United Kingdom . |

OTHER PUBLICATIONS

Advanced Concepts of Modular Glazings Sekurit Saint-Gobain.

*Primary Examiner*—Philip C. Kannan
*Attorney, Agent, or Firm*—Brooks & Kushman

[57] ABSTRACT

A molding construction is provided for concealing or finishing the space between the window and the body panel of a motor vehicle. The molding construction includes a mounting strip having a portion extending around and spaced laterally outwardly from the window edge and secured to the window edge by adhesive. A reveal which can be produced by various manufacturing processes and shaped in various configurations is dimensioned to meet the design criteria of the application and to aesthetically cover the space between the window edge and the body panel. The reveal includes a thermally stable tongue which is detachably lockingly received within a recess formed on the mounting strip. A resilient bumper or bulb is secured to and extends laterally outwardly from the mounting strip. This bumper engages a side flange of the body panel and cushions the mounting strip with its attached window against lateral movement. This design virtually eliminates all sources of stress on the glass. In some instances, it may also serve in an aesthetic as well as functional role in reducing noise.

10 Claims, 1 Drawing Sheet

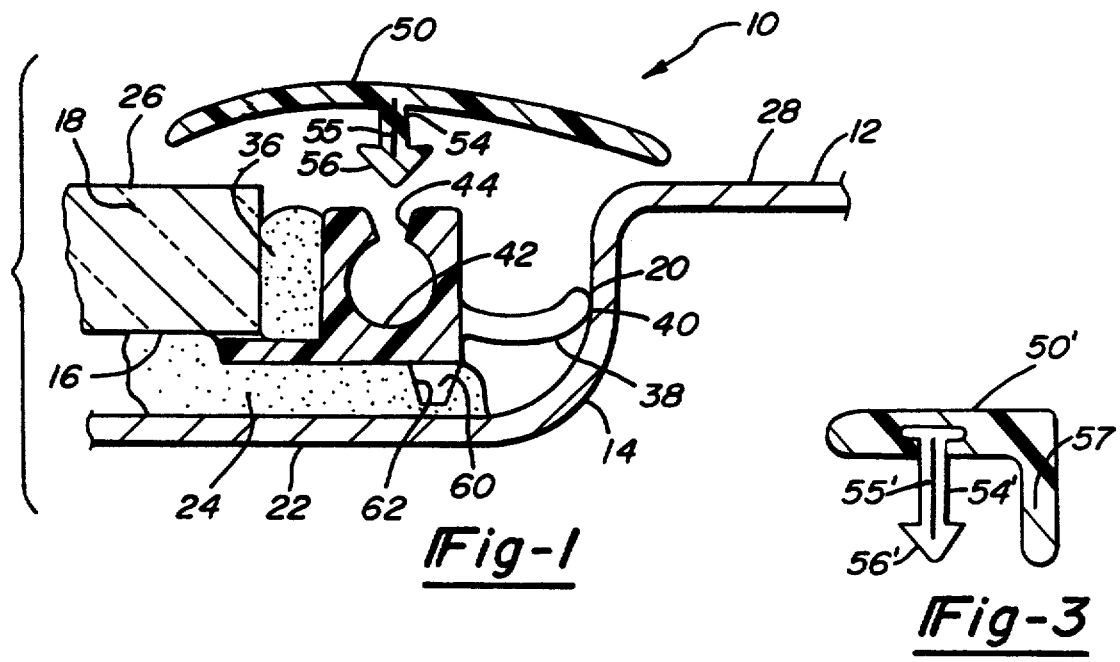
*Fig-1*
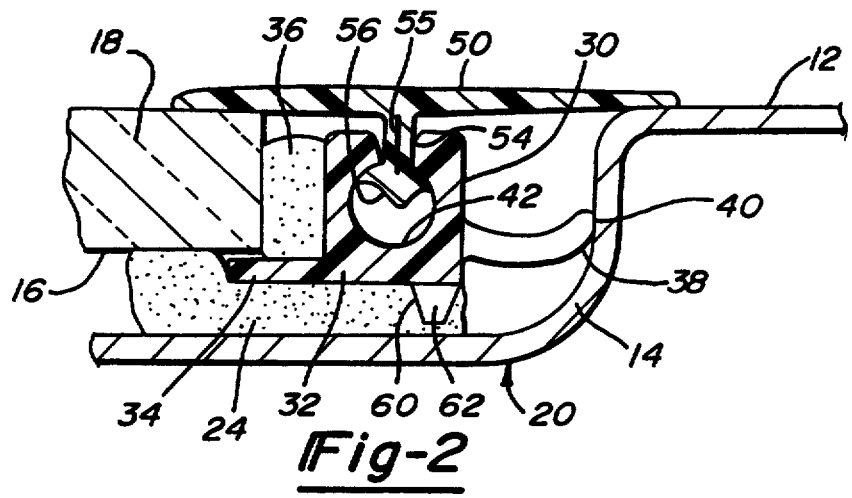
*Fig-3*
*Fig-2*
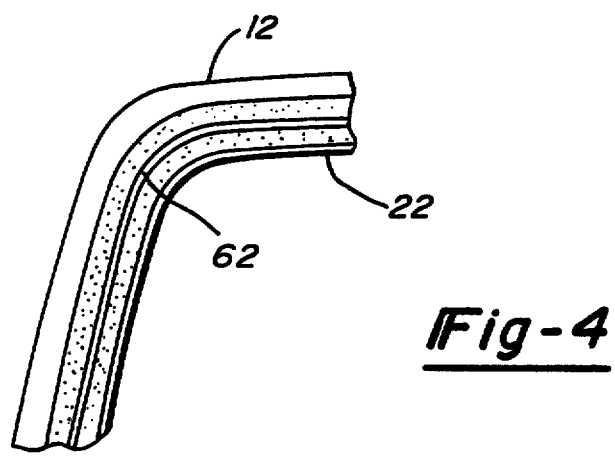
*Fig-4*

MOLDING CONSTRUCTION

This is a continuation of application Ser. No. 08/001,746, filed on Jan. 7, 1994, now abandoned.

BACKGROUND OF THE INVENTION

I. Field of the Invention

The present invention relates to a molding construction for mounting a window in a body panel of a motor vehicle and for concealing or finishing off the space between the edge of the window and the body panel.

II. Description of the Prior Art

In order to mount a window, such as the front windshield or rear windshield of a motor vehicle, on the motor vehicle, the motor vehicle includes an inwardly extending flange formed around the window opening. This flange includes an inwardly recessed bottom wall as well as a peripheral side wall. Typically, an adhesive, such as urethane, is applied to the bottom wall of the window flange or directly to the window. The window is then set upon the adhesive so that an outer surface of the window is substantially flush with the outer surface of the adjacent body panel or otherwise achieves the design's intent.

When mounting the window in its receiving opening in the above described fashion, a space is created between the edge of the window and the adjacent edge of the body panel due to body build variations, glass variations, and their associated tolerances. In order to complete the installation of the window in the receiving body panel, this space must be covered, finished off or otherwise concealed.

One previously known means for covering the space between the window edge and the body panel is to fasten a mounting strip to the outer edge of the window by any conventional fashion, such as an adhesive. This mounting strip includes a groove which faces outwardly from the window and body panel.

Thereafter, a reveal having an inwardly extending tongue is positioned over the space between the window and the adjacent body panel. Furthermore, this reveal slightly overlaps both the window as well as the mounting strip and the body panel so that the space between the window and the body panel is completely covered. The reveal includes an inwardly extending tongue which is lockingly, but detachably, received in the groove formed in the mounting strip. One example of such a window molding construction is disclosed in U.S. Pat. No. 4,950,019 entitled MOLDING CONSTRUCTION and issued on Aug. 21, 1990 to Michael G. Gross.

One disadvantage of this previously known molding construction is that the reveal with the mounting strip is physically attached to the glass and acquires the hardness of the glass. In use, however, the window moves slightly laterally with respect to its associated body panel. This lateral movement of the window is transmitted directly to the reveal through the mounting strip which causes chafing at the point of the reveal contacting the body panel. Such chafing can result in chipping or abrasion of the paint from the body panel, premature corrosion, and undesirable noise.

A still further disadvantage of this previously known molding construction is that it was difficult to remove the mounting strip to in turn facilitate removal of the glass. Due to limited space resulting from the design of this construction, removal of the reveal did not facilitate repair of the window as the mounting strip interfered with conventional means of glass repair. Instead, it was oftentimes necessary to destroy or otherwise ruin the reveal in the attempt to remove it from its associated mounting strip. Thus, with this previously known molding construction, it has been necessary to replace the reveal when the window replacement was repaired.

A still further disadvantage of these previously known molding constructions is that proper location of the window in the body panel during replacement was a difficult and time consuming task to achieve. This difficulty resulted in large part from the difficulty in properly centering the window in the receiving opening of the body panel due to manufacturing tolerances.

A still further disadvantage of this previously known molding construction is that the reveal is not thermally stable and as a result of normal changes in temperature, expands and contracts as a result of temperature swings as well as stresses introduced in processing which result in objectionable shrinkage.

SUMMARY OF THE PRESENT INVENTION

The present invention provides a molding construction which overcomes all of the above mentioned disadvantages of the previously known devices as well as providing further benefits.

In brief, the molding construction of the present invention comprises a mounting strip having a portion extending around and spaced laterally and consistently outwardly from the window edge. The mounting strip is attached to the window edge in any conventional fashion, such as by an adhesive.

A reveal is then provided and is dimensioned to extend across to meet design intent and to cover the space between the window edge and its associated body panel or otherwise meet design intent.

In order to detachably secure the reveal to the strip, the strip includes a receiving slot which detachably but lockingly receives a tongue secured to and extending outwardly from the reveal. Preferably, the slot has a circular cross-sectional shape while the tongue has a triangular cross-sectional shape to facilitate removal of the reveal with a tool and without damaging the reveal. This facilitates in plant body and paint repair processes as well as field repair. The slot and tongue provide a common means of locking a variety of different reveals that could be made using different processes to achieve varying appearances. In all cases, the reveal incorporates a length stabilizer to counter the effects of temperature swings and production stresses.

In order to cushion the window against lateral movement with respect to the body panel, a resilient bumper is secured to and extends laterally outwardly from the body portion of the mounting strip so that a distal end of the bumper or bulb abuts against the body panel. This resilient bumper thus cushions and inhibits lateral movement of the window with respect to the body panel reducing chafing, abrasion and noise.

A locating ridge is also preferably secured to and extends outwardly from an outer edge of the body portion of the mounting strip so that the ridge is generally perpendicular with respect to the body panel mounting flange. This mounting ridge forms a stop off for an adhesive used to secure the window to the body panel flange and can also be used as a locating groove for the mounting strip in the event that replacement of the window is required. An extending leg of the mounting strip contains the flow of adhesive. The material of the mounting strip is not compatible with the urethane adhesive and can be removed easily, further allowing for simplified glass repair.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 1 is an exploded sectional view illustrating a preferred embodiment of the present invention;

FIG. 2 is a sectional view similar to FIG. 1 but illustrating the molding construction in its assembled configuration; and FIG. 3 is a sectional view of an alternately configured reveal of the present invention; and FIG. 4 is a plan view illustrating a use of the present invention during replacement of the window.

DETAILED DESCRIPTION OF A PREFERRED EMBODIMENT OF THE PRESENT INVENTION

With reference first to FIG. 1, a preferred embodiment of the molding construction 10 of the present invention is thereshown for use with a motor vehicle having a body panel 12. The body panel 12 includes an inwardly recessed flange 14 which is adapted to receive and support the edge 16 of a window 18. The flange 14 includes an inwardly extending side wall 20 and a bottom wall 22 which supports and is secured to the window 18 in any conventional fashion, such as a urethane adhesive 24. Furthermore, the flange side wall 20 is dimensioned so that, with the window 18 secured to the flange bottom wall 22 by the adhesive 24, a front surface 26 of the window 18 is substantially flush, but inwardly spaced, from a front surface 28 of the body panel 12.

Referring now particularly to FIG. 2, the molding construction 10 of the present invention comprises an elongated mounting strip 30 having a main body portion 32. The main body portion 32 is generally rectangular in cross-sectional shape and is spaced laterally outwardly from and extends entirely around the outer edge of the window 18. An inwardly extending leg 34 protrudes inwardly from the main body portion 32 and has a portion which underlies the outer edge 16 of the window 18. Any conventional adhesive 36 fills the space between the main body portion 32 and the outer edge of the window 18 in order to secure the mounting strip 30 to the window 18.

The mounting strip is fixtured to eliminate glass periphery tolerance. The glass is placed onto the mounting strip so that the extending leg 34 contains the flow of adhesive 36 and also acts as an isolator of movement.

Still referring to FIG. 2, an outwardly extending and cross hatched resilient bumper or bulb 38 is secured to and extends outwardly from the main body portion 32 of the mounting strip 30. The resilient bumper 38 is dimensioned so that its outer distal edge 40 abuts against the side wall 20 of the body panel flange 14.

The main body portion 32 of the mounting strip 30 is constructed of a hard or elastomeric material while the bumper 38 is constructed of a soft elastomeric material. Preferably, the main body portion 32, and bumper or bulb 38, and a locating ridge 60 are of a one-piece dual durometer construction. Referring again to FIG. 1, a receiving groove 42 having a circular cross-sectional shape is formed in the main body portion 32. This receiving groove 42 is open through a restricted slot 44 forwardly of the mounting strip 30.

An elongated reveal 50 is provided and dimensioned so that the reveal 50 covers the space between the outer edge of the window 18 and the mounting flange 14. Additionally, as best shown in FIG. 2, the reveal 50 slightly overlies both the window 18 and the outer surface of the body panel 12.

The reveal 50 includes an inwardly projecting tongue 54 having a triangular shaped prong 56 at its distal end. A sheet of metallic foil or other stabilizer material 55 is provided as a length stabilizer and is embedded within the length of the tongue 54, as shown in FIGS. 1 and 2, prior to forming and helps to prevent the tongue from both shrinking and expanding when the tongue 54 is exposed to temperature variations and production stresses. The prong 56 is dimensioned to be received within the recess 42, as shown in FIG. 2, and, in doing so, detachably locks the reveal 50 to the mounting strip 30.

Referring to FIG. 3, an alternatively configured reveal 50' is shown and is capable of being received within the recess 42 of FIGS. 1 and 2. The reveal 50' has the tongue 54' with stabilizer 5' and triangular shaped prong 56' as shown in the embodiment of FIG. 2. The reveal 50' also has a leg 57 which extends the length of the reveal 50' parallel to the tongue 54. The leg 57 substantially fills the area between the main body portion 32 of the mounting strip and the side wall 20 of the flange 14 when the prong 56' is received within the recess 42.

In operation, the mounting strip 30 is positioned along the outer periphery of the window 18 and secured in place by the adhesive 36. Furthermore, since the adhesive 36 fills the space or gap between the main body portion 32 of the mounting strip 30 and the outer periphery of the window 18, the adhesive 36 compensates for manufacturing tolerances in the manufacture of the window 18. This allows for the mounting strip to protect the glass in shipment and further allows for shipping of quantities of glass in conventional shipping containers, rather than requiring increased shipping costs as required with modular glass.

The mounting strip 30 includes the elastomeric mounting ridge 60 which extends outwardly from the main body portion 32 substantially perpendicularly to the bottom wall 22 of the mounting flange 14. Thus, after the adhesive 24 is positioned on the bottom wall 22 of the flange as shown in FIG. 1, the locating ridge 60 is positioned adjacent the urethane adhesive 24 for a reason to be subsequently described.

Thereafter, the tongue 54 of the reveal 50 is snapped into the receiving groove 42 of the mounting strip 30 thus covering the space between the window 18 and the vehicle panel in the desired fashion.

During use of the vehicle, the window 18 moves slightly laterally with respect to the vehicle panel 12. However, the resilient bumper 38 and the adhesive 36 cushions and inhibits against this lateral movement of the window 18 thereby preventing chafing of the vehicle paint on the body panel 12 by the reveal 50 and reducing stress on the window 18.

In the event of window breakage, it is necessary to remove the reveal 50, the mounting strip 30 as well as the broken window 18. Since a space is provided between the circular groove 42 and the triangular prong 56 of the reveal 50, a tool (not shown) is inserted in the space and utilized to remove the reveal 50 from the vehicle without damaging the reveal.

After removing the reveal 50, the mounting strip 30 is removed and, as best shown, the locating ridge 60 forms an abutment groove 62, as shown in FIG. 4, with the edge of the urethane adhesive 24 on the bottom wall 22 of the vehicle panel mounting flange. The abutment groove 62 may also be constructed of a soft elastomeric material. In order to replace the window, the locating ridge 60 of a new mounting strip 30 is matched with this groove 62 thus automatically positioning the mounting strip 30 with respect to the vehicle panel. Thereafter, the window 18 is secured to the mounting strip 30 by the adhesive 36 and the reveal 50 is replaced thus completing the window replacement.

From the foregoing, it can be seen that the molding construction of the present invention achieves a number of advantages over the previously known devices. One advantage of the present invention is that it eliminates, or at least greatly reduces, the outer periphery glass tolerance as a variable in window replacement. Instead, the adhesive 36 compensates for these tolerances of the window size. The adhesive 36 also acts as somewhat of a cushion against lateral movement of the window 18.

Another advantage of Applicant's invention is the construction of the receiving groove and the prong between the mounting strip and the reveal. This construction permits the reveal to be easily removed without damaging the reveal in the previously described fashion.

A further advantage of Applicant's construction is the provision of the resilient bumper which cushions and inhibits the window against lateral movement as well as reduces noise. This also reduces the risk of paint chafing by the reveal.

A still further advantage of Applicant's invention is the provision of a locating ridge 60 which facilitates replacement of the window in the previously described fashion.

A further advantage is in the conventional shipping and handling or replacement of the glass.

A further advantage is the length stabilizer which thermally stabilizes the reveal.

A further advantage is the common receiving groove in the mounting strip which accepts a wide variety of reveals manufactured using different processes.

A still further advantage of Applicant's invention is that it allows auto designers greater design freedom to use constant and non-constant sections that are thermally stable at far less cost than conventional means such as encapsulated glass.

Having described my invention, however, many modifications thereto will become apparent to those skilled in the art to which it pertains without deviation from the spirit of the invention as defined by the scope of the appended claims.

I claim:

1. For use in conjunction with a device having a body panel and an inwardly recessed flange adapted to receive an edge of a window, said flange having a side wall and a bottom wall, a molding construction for concealing the space between the window edge and the body panel comprising:
   a mounting strip having a body portion extending around and spaced apart laterally outwardly from said window edge and having a substantially L-shaped cross section and an inwardly extending portion which protrudes inwardly from said body portion and underlies said window edge,
   means for attaching said mounting strip to said window edge, a reveal dimensioned to extend across and cover the space between said window edge and said body panel, said reveal overlying a portion of both said window and said body panel,
   means for detachably securing said reveal to said mounting strip, and
   resilient means between said mounting strip and said flange side wall for inhibiting lateral movement of said window with respect to said body panel.

2. The invention as defined in claim 1 wherein said resilient means comprises an elastomeric bumper.

3. The invention as defined in claim 2 wherein said bumper is secured to and extends laterally outwardly from said mounting strip.

4. The invention as defined in claim 3 wherein said bumper and said mounting strip are of a one-piece construction.

5. The invention as defined in claim 1 wherein said mounting strip includes an elastomeric locating ridge extending substantially perpendicularly with respect to said bottom wall of said flange.

6. The invention as defined in claim 1 wherein said mounting strip comprises a wall having a free edge which overlies an inside surface of said window and wherein said means for securing said strip to said window comprises an adhesive.

7. The invention as defined in claim 1 wherein said means for detachably security said reveal to said mounting strip comprises a receiving slot formed in said mounting strip, said receiving slot having a circular cross-sectional shape and having a restricted opening facing outwardly from said mounting strip, and a tongue extending outwardly from said reveal and having a triangular shaped distal end, said tongue adapted to be received in said recess.

8. The invention as defined in claim 7, wherein said tongue comprises a length stabilizer provided within said tongue.

9. The invention as defined in claim 7, wherein the cross sectional shape of said reveal is nonconstant.

10. For use in conjunction with a device having a body panel and an inwardly recessed flange adapted to receive an edge of a window, said flange having a side wall and a bottom wall, a molding construction for concealing the space between the window edge and the body panel comprising:
   a mounting strip having a body portion extending around and spaced apart laterally outwardly from said window edge and having a substantially L-shaped cross-section and an inwardly extending portion which protrudes inwardly from said body portion and underlies said window edge,
   means for attaching said mounting strip to said window edge,
   means for detachably securing said reveal to said mounting strip wherein said means for detachably securing said reveal to said mounting strip comprises a receiving slot formed in said mounting strip, said receiving slot having a circular cross sectional shape and having a restricted opening facing outwardly from said mounting strip, and a tongue extending outwardly from said reveal having a triangular shaped distal end, said tongue adapted to be received in said mounting strip, and
   a reveal dimensioned to extend across and cover the space between said window edge and said body panel, said reveal overlying a portion of both said window and said body panel and, said reveal further comprising a leg extending parallel to said triangular shaped distal end of said tongue.

* * * * *

UNITED STATES PATENT AND TRADEMARK OFFICE
CERTIFICATE OF CORRECTION

PATENT NO. : 5,396,746
DATED : March 14, 1995
INVENTOR(S) : Bruce F. Whitmer

It is certified that error appears in the above-indentified patent and that said Letters Patent is hereby corrected as shown below:

```
Column 4, Line 25
"stabilizer 5'" should be --stabilizer 55'--.

Column 6, Line 26,
            "security" should be --
securing--
```

Signed and Sealed this

Sixteenth Day of May, 1995

Attest:

BRUCE LEHMAN

Attesting Officer

Commissioner of Patents and Trademarks